(12) United States Patent
Wang et al.

(10) Patent No.: US 12,098,954 B2
(45) Date of Patent: Sep. 24, 2024

(54) OPTICAL DEVICE AND METHOD

(71) Applicant: Oxford University Innovation Limited, Oxford (GB)

(72) Inventors: Robin Wang, Oxford (GB); Peter Norreys, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 198 days.

(21) Appl. No.: 17/639,924

(22) PCT Filed: Sep. 4, 2020

(86) PCT No.: PCT/GB2020/052136
§ 371 (c)(1),
(2) Date: Mar. 3, 2022

(87) PCT Pub. No.: WO2021/044170
PCT Pub. Date: Mar. 11, 2021

(65) Prior Publication Data
US 2022/0341781 A1    Oct. 27, 2022

(30) Foreign Application Priority Data

Sep. 4, 2019 (GB) ..................................... 1912726
Dec. 20, 2019 (GB) ..................................... 1919047

(51) Int. Cl.
*G01J 3/28* (2006.01)
*G01J 3/02* (2006.01)

(52) U.S. Cl.
CPC ........... *G01J 3/2823* (2013.01); *G01J 3/0229* (2013.01); *G01J 3/0248* (2013.01)

(58) Field of Classification Search
CPC ...... G01J 3/2823; G01J 3/0229; G01J 3/0248; G01J 3/36; G01J 3/14; G01J 3/18; G01J 3/28
See application file for complete search history.

(56) References Cited

U.S. PATENT DOCUMENTS 6,504,943 B1 * 1/2003 Sweatt .................. G06V 20/13
348/169
8,810,650 B1 * 8/2014 Neumann ............. G01J 3/2823
348/142

(Continued)

FOREIGN PATENT DOCUMENTS

EP    3 477 246 A1    5/2019
JP    H02-161937 A    6/1990

(Continued)

OTHER PUBLICATIONS

International Search Report and Written Opinion for WO 2021/023973 (PCT/GB2020/052136), dated Nov. 24, 2020, pp. 1-14.

(Continued)

*Primary Examiner* — Abdullahi Nur
(74) *Attorney, Agent, or Firm* — Thomas|Horstemeyer, LLP (57) ABSTRACT

A hyperspectral imaging device (100) is provided comprising an input (102) for receiving a light field from a scene (106), an encoder (108), at least one dispersive element (110, 112), at least one array detector (114, 110) and a processor (118). The encoder (108) is arranged to receive at least a portion of the light field from the input (102) and transform it to provide a first and second encoded light (120, 122) field having different spatial patterns. At least one dispersive element (110, 112) is arranged to apply spectral shear to the first and second encoded light fields (120, 122) respectively to provide first and second sheared light fields (124, 126). At least one array detector (114, 116) is arranged to detect the (Continued)

first and second sheared light fields (124, 126). The processor (118) is arranged to process an output from the at least one array detector (114, 116) to determine a datacube (128) corresponding to a hyperspectral image of the scene.

19 Claims, 5 Drawing Sheets

(56) References Cited

U.S. PATENT DOCUMENTS

| | | | | |
|---|---|---|---|---|
| 2003/0151834 A1* | 8/2003 | Penn | ............ | G02B 7/181 359/833 |
| 2005/0270528 A1 | 12/2005 | Geshwind et al. | | |
| 2010/0309467 A1* | 12/2010 | Fox | ............ | G01J 3/0294 356/326 |
| 2013/0002858 A1* | 1/2013 | Bridge | ............ | H04N 19/97 348/340 |
| 2013/0128042 A1* | 5/2013 | Bridge | ............ | H04N 23/60 348/143 |
| 2014/0027616 A1* | 1/2014 | Twede | ............ | H04N 25/00 250/208.1 |
| 2014/0267881 A1* | 9/2014 | Bernal | ............ | G02B 27/1013 348/360 |
| 2014/0374573 A1* | 12/2014 | Arce | ............ | G01J 3/06 250/208.1 |
| 2017/0284867 A1 | 10/2017 | Gensemer et al. | | |
| 2017/0366763 A1 | 12/2017 | Lin et al. | | |

FOREIGN PATENT DOCUMENTS

| | | |
|---|---|---|
| JP | 2017-49043 A | 3/2017 |
| WO | 2019/025759 A1 | 2/2019 |

OTHER PUBLICATIONS

UK Search Report for GB 1912726.5, dated Mar. 31, 2020, p. 1.
Xue Dong et al: "DMD-based hyperspectral imaging system with tunable spatial and spectral resolution", Optics Express, vol. 27, No. 12, Jun. 3, 2019 (Jun. 3, 2019), p. 16995.
Japanese Office Action for Patent Application No. 2022-514534, dated Apr. 2, 2024, pp. 1-4 (Translation Only).

* cited by examiner

OPTICAL DEVICE AND METHOD

CROSS-REFERENCE TO RELATED APPLICATIONS

This application is the National Stage of International Application No. PCT/GB2020/052136, filed Sep. 4, 2020, which claims priority to GB 1912726.5, filed Sep. 4, 2019, and GB 1919047.9, filed Dec. 20, 2019, which are entirely incorporated herein by reference.

TECHNICAL FIELD

The present disclosure relates to a hyperspectral imaging device and a method of hyperspectral image acquisition.

BACKGROUND

Hyperspectral imaging involves the acquisition of a three dimensional datacube of a scene, collecting intensity through one spectral and two spatial domains. The datacube is in the format $I(x,y,\lambda)$. Each slice of the data cube comprises an xy image corresponding with a particular wavelength of light. Conventional hyperspectral imagers rely on two main capture methods: capture of a datacube using a scanning 2D sensor, or spatially multiplexing spectral information to be retrieved after post processing. Scanning imagers are limited in orientation and must scan (hence the name), which is a process that takes considerable time and introduces motion artefacts. Multiplexing imagers largely avoid errors introduced by scanning, but require significant sacrifice of spatial information or complex sensors to achieve hyperspectral imaging. Multiplexing imagers are limited in resolution and or are difficult to manufacture.

In order to achieve a single-shot hyperspectral capture and to circumvent the resolution sacrifice of multiplexing spectrometers, algorithmic imaging approaches have been trialled. The most notable examples has been the Coded Aperture Snapshot Spectral Imager (CASSI) and its variants. CASSI relies on compressed sensing—a signal processing framework for reconstructing underdetermined linear systems. By manipulating an incoming signal into a format viable for a compressed sensing reconstruction, CASSI can reconstruct a hyperspectral datacube from a signal obtained from a single exposure of a conventional two-dimensional detector. However, whilst CASSI achieves single shot imaging without significant sacrifice of spatial resolution nor complex multiplexing, it can only capture datacubes at limited resolution with occasional artefacts.

It is an object of the present disclosure to overcome or at least ameliorate the shortcomings associated with known hyperspectral imaging devices and hyperspectral imaging methods.

SUMMARY

According to a first aspect of the present disclosure there is provided a hyperspectral imaging device comprising an input for receiving a light field from a scene, an encoder, at least one dispersive element, at least one array detector and a processor. The encoder is arranged to receive at least a portion of the light field from the input and transform it to provide first and second encoded light fields having different spatial patterns. The at least one dispersive element is arranged to apply second spectral shear to the first and second encoded light fields respectively to provide first and second sheared light fields. The at least one array detector is arranged to detect the first and second sheared light fields. The processor is arranged to process an output from the at least one array detector to determine a datacube corresponding to a hyperspectral image of the scene.

The imaging device may be configured to obtain the datacube from a single shot (e.g. one frame of data from the first and second array detectors). In some embodiments the imaging device may be configured to obtain the datacube from more than one shot (for example, from two shots, three shots or more).

The provision of more than one encoding pattern in the detected light fields enables a tomographic reconstruction of the original hyperspectral datacube thereby enhacing fidelity over approaches in which a data is captured based on a single encoding pattern.

In some embodiments, more than two encoded light fields may be provided and detected, for example, there may be four different encoded light fields (and each may have a different encoding).

In some embodiments, there may be a single detector, and a reconfigurable encoder arrangement. In such an embodiment, first and second spatial patterns may be temporally separated, with the encoder reconfigured between detection of the first and second sheared light fields. A single dispersive element may be used in such an embodiment (e.g. between the reconfigurable encoder and the single detector).

In other embodiments, the encoder may be arranged to provide spatially separated first and second encoded light fields.

The first and second light fields may comprise complementary spatial patterns (whether the first and second encoded light fields are spatially or temporally separated). The complementary spatial patterns may be complementary random or pseudorandom spatial patterns.

The encoder may be configured to reflect the first and second encoded light fields in different directions.

Some embodiments may combine spatial and temporal separation of encoded light fields, detecting both temporally and spatially separated encoded light fields (e.g. by a reconfigurable encoder that provides spatially separated first and second light fields, and collecting more than one shot from the detectors, with different encoder patterns).

Advantageously, the generation of first and second copies of the light field which are encoded with complementary spatial patterns and separately sheared prior to detection provides for greater fidelity in the datacube reconstruction. This is analogous to tomography whereby the first and second copies effectively correspond to projections of the datacube along different directions, thereby providing additional information about the datacube than if only a single sheared and encoded copy were used. The combination of encoding and shearing with detection of two or more copies may be referred to as compressive tomography.

The at least one dispersive element may comprise a first dispersive element configured to apply a first spectral shear to the first encoded light field, and a second dispersive element configured to apply a second spectral shear to the second encoded light field.

The at least one dispersive element may be or comprise a transmissive dispersive element. One or both of the first and second dispersive elements may be a transmissive dispersive element.

The first and second spectral shears may have different magnitudes.

The first and second spectral shears may have different spatial directions.

The encoder may comprise a digital micromirror device, a static mask, a liquid crystal device (e.g. liquid crystal on silicon).

The encoder may be or comprise a transmissive encoder. The encoder and the at least one dispersive element may both be transmissive. Using transmissive components may enable easier miniaturisation of the hyperspectral imaging device, and in particular when performing compressive tomography.

The encoder may comprise a first encoder portion configured to provide the first encoded light field and a second encoder portion configured to provide the second encoded light field. The first and second encoder portions may be disposed on or along respective first and second discrete imaging paths. The first and second discrete imaging paths may be parallel to one another. Discrete imaging paths may remove the need for reflective elements such as a beam splitter, which may further enable easier miniaturisation of the hyperspectral imaging device.

The first and second dispersive elements may be disposed on the respective first and second discrete imaging paths.

The hyperspectral imaging device may further comprise a spectral encoder configured to spectrally encode the first and second sheared light fields prior to detection by the at least one array detector. This allows the hyperspectral imaging device to encode in both the spatial and spectral domains. This provides an additional degree of freedom in encoding, which may allow for a higher degree of incoherence (randomness) in the sampling of the datacube and in turn may improve reconstruction of the datacube.

The spectral encoder may comprise a first spectral encoder portion configured to spectrally encode the first sheared light field, and a second spectral encoder portion configured to spectrally encode the second sheared light field. The first and second spectral encoder portions may be disposed on or along the respective first and second discrete imaging paths. The spectral encoder may be a transmissive encoder.

The at least one array detector may comprise a first and second array detector, respectively arranged to detect the first and second sheared light fields.

The hyperspectral imaging device may further comprise a beam splitter and a third array detector, wherein the beam splitter is arranged between the input and the encoder and is arranged to provide a portion of the light field to the third array detector and the remaining portion of the light field to the encoder.

The portion of the light field provided to the third array detector may be unsheared (or spectrally undispersed).

The hyperspectral imaging device may further comprise a focussing or relay element located between the input and the encoder.

The focussing element may be arranged to image the scene onto the encoder.

At least one of the dispersive elements may comprise a concave grating.

The at least one dispersive element may comprise a combination of a focussing element (e.g. refractive or reflective) and a planar grating. The planar grating may comprises a transmissive grating, double Amici prism etc.

The at least one dispersive element may be arranged to image the first and second sheared light fields onto the at least one array detector respectively. For example, the first and second dispersive element may be configured to respectively image the first and second sheared light fields on the first and second array detectors.

The encoder and the at least one dispersive element may be integrated into a single component. The single component may be configured to provide first and second light fields which are both encoded and sheared. This may further enable easier miniaturisation of the hyperspectral imaging device.

The integrated encoder and at least one dispersive element may comprise an encoding pattern disposed on the at least one dispersive element. The at least one dispersive element may be a diffraction grating. The encoding pattern may be lithographically printed onto the at least one dispersive element.

The processor may be arranged to determine the datacube by solving a minimization problem.

The minimization problem may comprise a regularizer that promotes sparsity.

The processor may be arranged to solve a minimization problem of the form:

$$\min_I\{\frac{1}{2}\|[S_1,S_2]^T - [k_1 o_1, k_2 o_2]^T I\|^2 + \alpha\phi(I)\}$$

where $S_1$ is the signal detected by the first detector, $S_2$ is the signal detected by the second detector, $k_1$ and $k_2$ are weighting factors, $o_1$ and $o_2$ are measurement operators dependent on the encoder and first and second dispersive elements, $\phi(I)$ is a regularizer that promotes sparsity, $\alpha$ is a regularization paramter, $\|.\|$ denotes the $l^2$ norm and $I=I(x,y,\lambda)$ is the datacube.

The processor may be further arranged to process an output from the third detector jointly with the outputs from the first and second detectors to determine the datacube. In such embodiments, the processor may be arranged to solve a minimization problem of the form:

$$\min_I\{\frac{1}{2}\|[S_1,S_2,S_3]^T - [k_1 o_1, k_2 o_2, k_3 o_3]^T I\|^2 + \alpha\phi(I)\}$$

where $S_1$ is the signal detected by the first detector, $S_2$ is the signal detected by the second detector, $S_3$ is the signal detected by the third detector, $k_1$, $k_2$ and $k_3$ are weighting factors, $o_1$, $o_2$ and $o_3$ are measurement operators dependent on the encoder, the first and second dispersive elements and the beam splitter, $\phi(I)$ is a regularizer that promotes sparsity, $\alpha$ is a regularization parameter, $\|.\|$ denotes the $l^2$ norm and $I=I(x,y,\lambda)$ is the datacube.

According to a second aspect of the present disclosure there is provided a method of hyperspectral image acquisition, comprising:
  receiving a light field from a scene;
  transforming the light field to provide first and second encoded light fields having different spatial patterns;
  applying spectral shear to the first and second encoded light fields respectively to provide first and second sheared light fields;
  detecting the first and second sheared light fields respectively to provide detection data; and
  processing the detection data to determine a datacube corresponding to a hyperspectral image of the scene.

The features (including optional features) of any aspect may be combined with those of any other aspect, as appropriate. The features described with reference to the imaging device of the first aspect may be used in the method of the second aspect (e.g. the method may obtain the datacube from a single shot etc).

BRIEF DESCRIPTION OF THE DRAWINGS

Example embodiments will be described, by way of example only, with reference to the drawings, in which.

It should be noted that the Figures are diagrammatic and not drawn to scale. The same reference signs are generally used to refer to corresponding or similar feature in modified and different embodiments.

DETAILED DESCRIPTION

Figure 1:
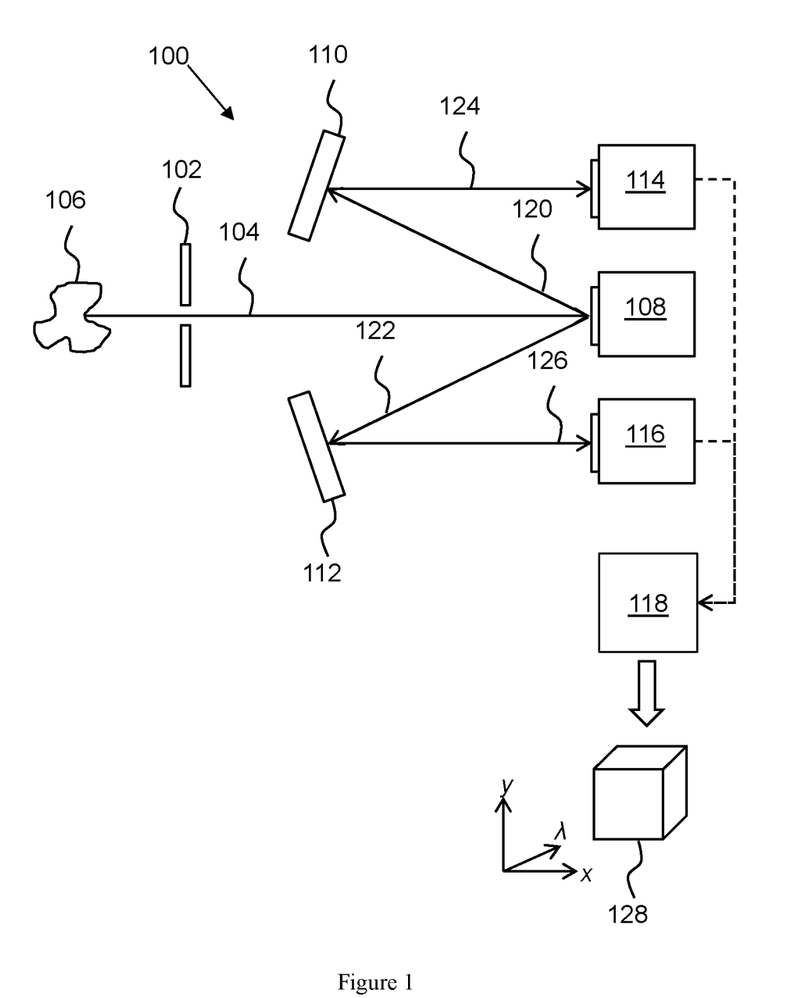
FIG. 1 is a schematic of a hyperspectral imaging device according to an embodiment of the present disclosure.

FIG. 1 illustrates a hyperspectral imaging device 100 according to an embodiment of the present disclosure. The hyperspectral imaging device 100 is capable of single shot hyperspectral imaging. The hyperspectral imaging device 100 comprises an input 102 for receiving a light field 104 from a scene 106, an encoder 108, first 110 and second 112 dispersive elements, first 114 and second 116 array detectors and a processor 118.

The input 102 may comprise an aperture (for example, or a slit), and is configured to direct light from the scene toward the encoder 108.

The encoder 108 is arranged to receive at least a portion of the light field 104 from the input and transform it to provide spatially separated first 120 and second 122 encoded light fields having complementary binary spatial patterns. The encoder 108 may be a binary encoder comprising an array of reflective elements (e.g. mirrors) that direct light either in a first direction 120, or in a second direction 122, different to the first direction 120. For example, the encoder 108 may consist of a plurality of a first type of reflective element and a plurality of a second type of reflective element. There may be similar (e.g. equal) numbers of the first and second type of reflective element, but this is not essential. The first type of element may be configured to reflect light incident on the encoder 108 in the first direction 120. The second type of element may be configured to reflect light incident on the encoder 108 in the second direction 122. The light reflected in the first direction 120 comprises a first encoded light field, and the light reflected in the second direction comprises a second encoded light field.

In some embodiments the reflective elements may be fixed (for example, the encoder 108 may comprise a fixed mirror array). In other embodiments the pattern of the first and second type of reflective element may be reconfigurable. For example, the encoder 108 may comprise an array of moveable micro-mirrors, such as a digital micro-mirror device (which are rapidly moveable between a first angular position and a second angular position). A reconfigurable encoder 108 may be advantageous, since additional information about a relatively slowly changing scene may be obtained by using different encoding patterns and combining the resulting data in order to obtain a hyperspectral image cube (i.e. using more than one shot).

In other embodiments, the encoder 108 may not be entirely reflective. For example, in some embodiments a beam splitter may be used to provide light to a first array of apertures and to a second array of apertures, complementary to the first array. The encoder in this sort of embodiment comprises the first and second array of apertures. In some embodiments, a partially reflective encoder may be employed, in which a proportion (e.g. 50%) of the incident light is encoded and transmitted, and a proportion of the incident light is encoded and reflected.

Returning to FIG. 1, the first and second dispersive elements 110, 112 are arranged to apply first and second spectral shears to the first and second encoded light fields respectively to provide first 124 and second 126 sheared light fields. The dispersive elements 110, 112 may comprise reflective dispersive elements such as diffraction gratings, but any dispersive element may be used (including transmissive dispersive elements). It may be advantageous for the first and second spectral shears to be different (for example, positive and negative), but this is not essential.

The first and second dispersive elements 110, 112 may be curved diffraction gratings, configured to image the first and second sheared light fields onto the respective detectors. In other embodiments, the first and second dispersive elements 110, 112 may each comprise a flat diffraction grating and a focussing element (e.g. a lens or mirror), with the focussing element configured to image the sheared light field onto the detector.

The first and second array detectors 114, 116 are arranged to detect the first and second sheared light fields respectively. The processor 118 is arranged to process outputs from the first and second detectors 114, 116 to determine a datacube 128 corresponding to a hyperspectral image of the scene.

The two sheared light fields 124, 126 may be expressed as:

$$S_1(x, y) = \sum_\lambda (a_1 * I)(x, y + c_1\lambda, \lambda), \quad (1)$$

$$S_2(x, y) = \sum_\lambda (a_1 * I)(x, y + c_2\lambda, \lambda) \quad (2)$$

where the subscripts 1 and 2 denote the first and second sheared light field respectively, and coefficients a represent systematic aberrations and filtering, and coefficients c represent the dispersion from the respective dispersive element. Note that the coefficients $c_1$ and $c_2$ need not have opposite signs. I denotes the input datacube $I(x,y,\lambda)$.

Reconstruction of the hyperspectral datacube 128 may be performed by the processor 118. The data acquisition process may be expressed as:

$$[S_1, S_2]^T = [k_1 o_1, k_2 o_2]^T I(x,y,\lambda) \quad (3)$$

where S is the signal detected at the respective detector, coefficients k are scaling factors to balance the intensity differences between the signals and the 'o's represent the measurement operators for the signals. Image reconstruction within the compressed sensing framework may be conducted by solving the minimisation problem:

$$\min_I \{½\|[S_1, S_2]^T - [k_1 o_1, k_2 o_2]^T I\|^2 + \alpha\phi(I)\} \quad (4)$$

where $\phi(I)$ is a regularizer that promotes sparsity, $\alpha$ is a regularization paramter, $\|.\|$ denotes the $l^2$ norm and $I=I(x,y,\lambda)$ is the datacube. The minimisation problem posed in (4) may be solved using an existing methodology (e.g. TwIST, LASSO, wavelet deconvolution etc).

The use of a complementary encoding scheme with two detectors enables a single shot hyperspectral image to be obtained in which none of the incident light is wasted, and which enables efficient tomographic reconstruction of the hyperspectral datacube, because the encoding of the light detected at the first and second detector is complementary.

Figure 2:
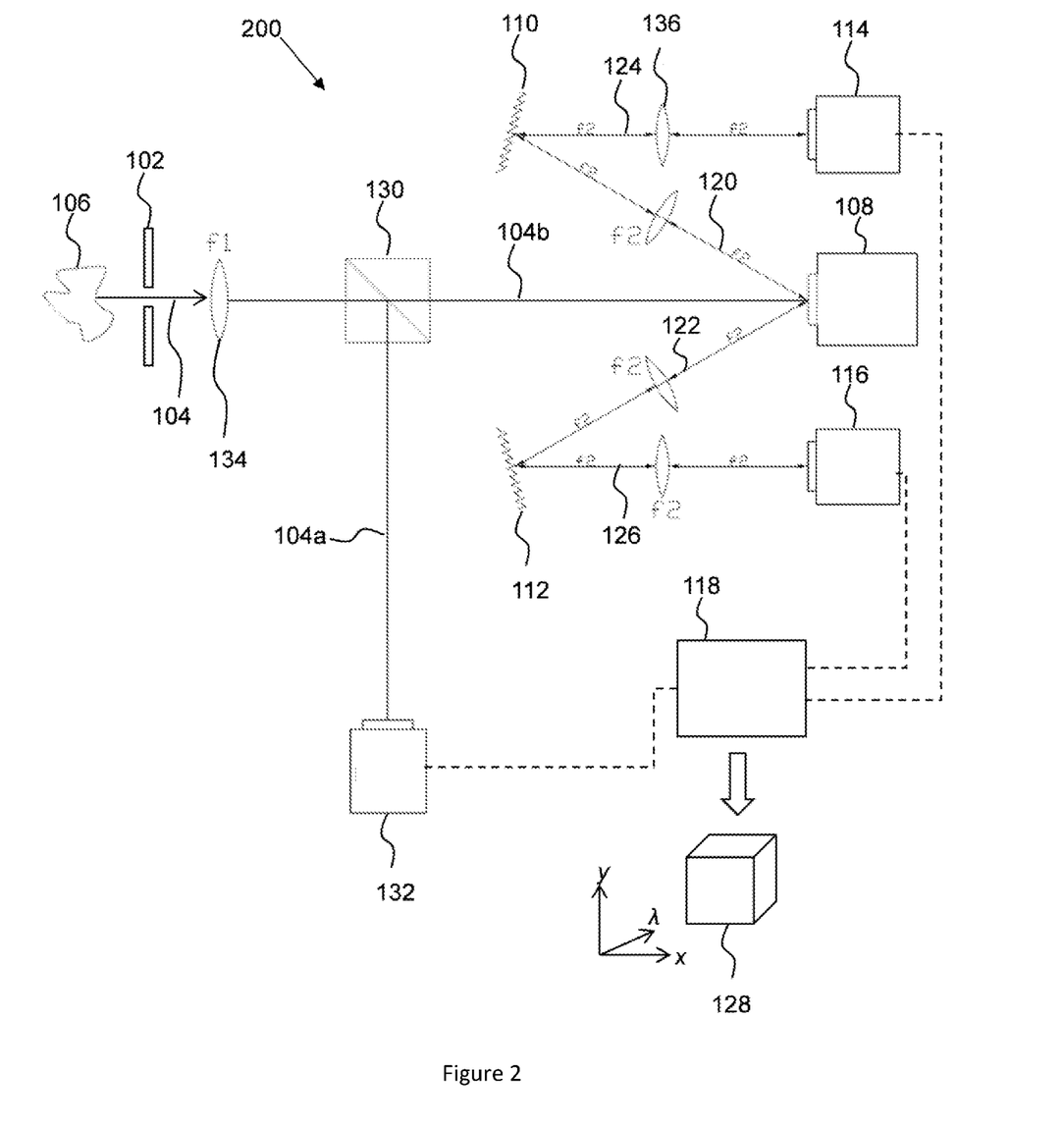
FIG. 2 is a schematic of a hyperspectral imaging device according to another embodiment.

FIG. 2 shows a further embodiment 200, in which a beam splitter 130 is also provided. Furthermore, lenses 134, 136 are included (not all of which are labelled). The description of elements with the same reference numerals in FIG. 1 are equally applicable to FIG. 2.

The beam splitter 130 which splits the light field 104 into a first portion 104a and a second portion 104b. The second portion 104b is directed towards the encoder 108 whereas the first portion 104a is directed towards a third array detector 132. The third array detector 132 may be configured to take a direct image (i.e. the sum of the intensities from an un-sheared image over the full spectral range at each x,y pixel position). The signal detected by the third detector may be expressed as:

$$S_3(x, y) = \sum_\lambda (a_3 * I)(x, y, \lambda) \quad (5)$$

The data acquisition process with the additional third detector may be expressed as:

$$[S_1, S_2, S_3]^T = [k_1 o_1, k_2 o_2, o_3]^T I(x,y,\lambda) \quad (6)$$

The reconstruction of the image datacube may be conducted by solving the minimisation problem (which uses similar notation to (4)):

$$\min_I \{ \tfrac{1}{2} \| [S_1, S_2, S_3]^T - [k_1 o_1, k_2 o_2, k_3 o_3]^T I \|^2 + \alpha \phi(I) \} \quad (7)$$

In the embodiment of FIG. 2, the focussing lens 134 is shown, which focuses the light from the input 102 at the encoder 108 and the third detector 132. Such a focussing lens may also be used in the embodiment of FIG. 1 to focus light at the encoder 108. Although a refracting lens is shown, a focussing element comprising a reflector may alternatively be used.

The addition of the third detector, which obtains a direct image, provides further information for the reconstruction of the hyperspectral datacube. This direct image is also straightforward to compare visually with the output datacube to provide confidence that this is correct.

Also depicted in FIG. 2 are two focussing lenses 136 for each of the optical paths from the encoder 108 to the first and second array detectors 114, 116. A similar arrangement of lenses may also be used in the embodiment of FIG. 1. A lens between the encoder 108 and the first dispersive element 110 collimates the light from the encoder 108 at the first dispersive element 110. A further lens 136 between the first dispersive element 110 and the first array detector 114 focusses the light from the first diffractive element 110 at the first array detector 114. A similar arrangement is used for the other detection path (leading to the second array detector 116).

Preferably, the lenses are matched, with focal length f2, so that the distance from the dispersive element 110, 112 to the encoder 108 and the array detector 114, 116 is the same (with the lenses placed halfway between the encoder and dispersive element, and halfway between the dispersive element and the first array detector).

Although refractive lenses are depicted in the example embodiment of FIG. 2 (which may be readily available, compact and low cost), reflective elements may be used instead, which may be advantageous in that they will tend not to introduce any unwanted dispersion.

Figure 3:
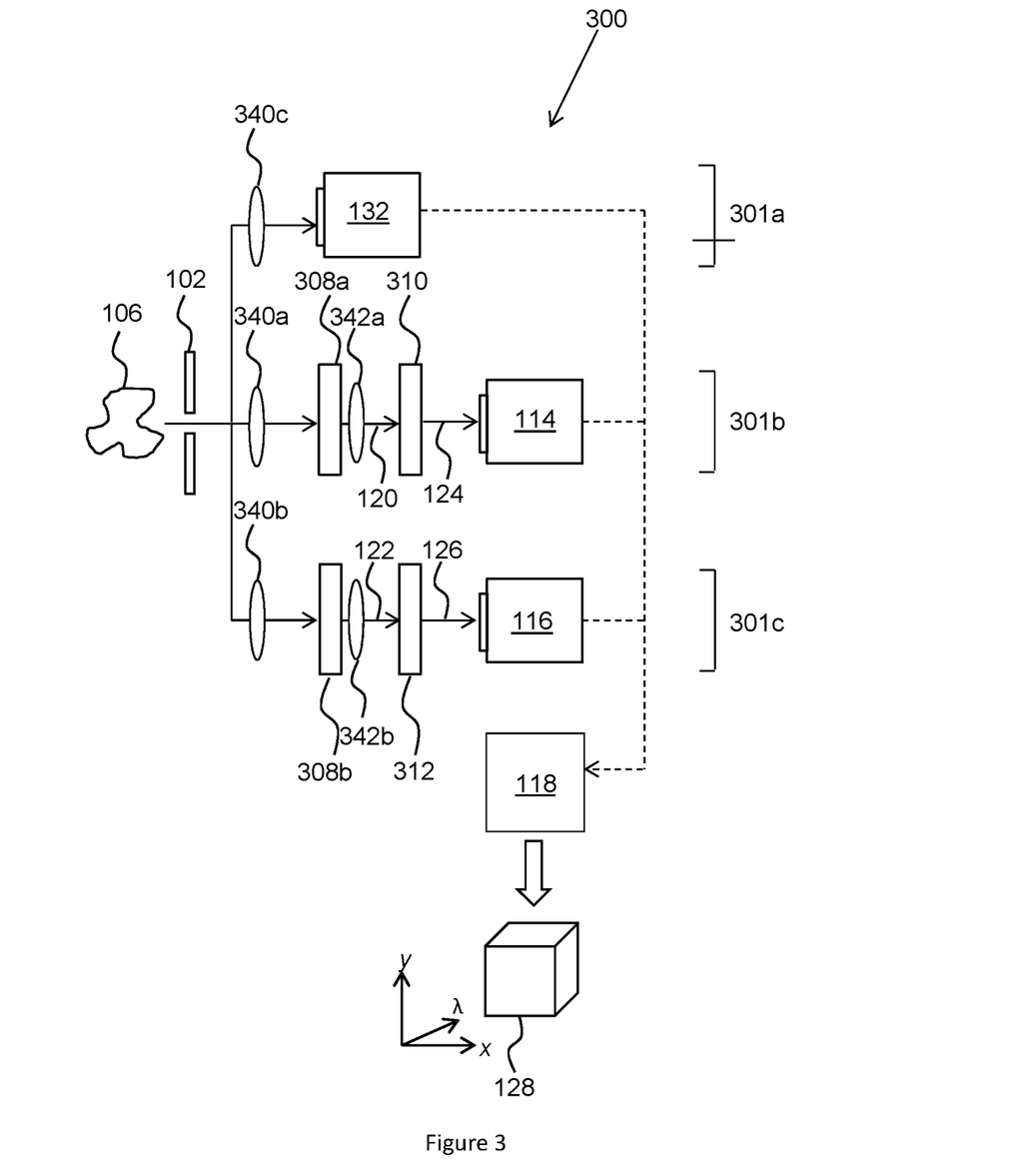
FIG. 3 shows another embodiment of a hyperspectral imaging devic 300.

FIG. 3 shows another embodiment of a hyperspectral imaging device 300. The description of elements with the same or like reference numerals in FIGS. 1 and 2 are equally applicable to FIG. 3. The hyperspectral imaging device 300 comprises an input 102 for receiving a light field 104 from a scene 106, an encoder 308, first 310 and second 312 dispersive elements, first 114, second 116 and third 132 array detectors and a processor 118. The hyperspectral imaging device 300 operates using the same principles as for the hyperspectral imaging devices 100, 200 described above, but utilises transmissive components rather than reflective components. Use of transmissive components may enable easier miniaturisation (and potentially reduced cost) of the hyperspectral imaging device 300, by avoiding use of reflective components (such as digital micro-mirror devices, beam splitters and reflective diffraction gratings), and in particular when performing compressive tomography.

In the embodiment shown, the hyperspectral imaging device 300 comprises first 301a, second 301b and third 301c discrete, separate imaging paths from the scene 106 to the respective array detectors 114, 116, 132. In the embodiment shown, the discrete imaging paths 301a, 301b, 301c are parallel to one another to avoid the need for a beam splitter, which may further ease miniaturisation of the hyperspectral imaging device 300. The direction of the arrows from the input 102 along each imaging path 301a, 301b and 301c are schematic in nature and do not necessarily illustrate the physical path of light through the hyperspectral imaging device 300.

The encoder 308 comprises a first encoder portion 308a and a second encoder portion 308b. The first encoder portion 308a operates as part of the first discrete imaging path 301a, in conjunction with the first dispersive element 310 and the first array detector 314. In the embodiment shown, an imaging lens 340a is located between the input 102 and the first encoder portion 308a, and a relay lens 342a is located between the first encoder portion 308a and the first dispersive element 310. In other embodiments, the imaging lens 340a and the relay lens 342a may be omitted. Similarly, the second encoder portion 308b operates as part of the second discrete imaging path 301b, in conjunction with the second dispersive element 312 and the second array detector 116. In the embodiment shown, an imaging lens 340b is located between the input 102 and the second encoder portion 308b, and a relay lens 342b is located between the second encoder portion 308b and the second dispersive element 312. In other embodiments, the imaging lens 340b and the relay lens 342b may be omitted.

The first 108a and second 108b encoder portions are each arranged to receive at least a portion of the light field 104 from the input 102 and transform it to provide respective first 120 and second 122 encoded light fields. The first 120 and second 122 encoded light fields have different spatial patterns. In the embodiment shown, the first 308a and second 308b encoder portions are transmissive encoders, for example first and second arrays of apertures or masks. In some embodiments, the first 308a and second 108b encoder portions are complementary to one another to produce first 120 and second 122 encoded light fields comprising complementary spatial patterns, but this is not essential.

The first 110 and second 112 dispersive elements are arranged to apply first and second spectral shears to the first 120 and second 122 encoded light fields respectively, to provide first 124 and second 126 sheared light fields. In the embodiment shown, the first 110 and second 112 dispersive elements are each transmissive dispersive elements, such as a transmissive diffraction grating. It may be advantageous for the first and second spectral shears to be different (for example, positive and negative), but this is not essential.

The first 114 and second 116 array detectors are arranged to detect the first 124 and second 126 sheared light fields respectively. The processor 118 is arranged to process outputs from the first 114 and second 116 detectors to determine a datacube 128 corresponding to a hyperspectral image of the scene. The processor 118 may reconstruct the hyperspectral datacube 128 according to equations (1) to (7) discussed above.

The third discrete imaging path 301c runs from the input to the third array detector 132 which provides a direct image of the scene 106, providing further information for the reconstruction of the hyperspectral datacube 128. The direct image is straightforward to compare visually with the output datacube 128 to provide confidence that the datacube 128 is correct. In the embodiment shown, an imaging lens 340c is located between the input 102 and the third array detector 132. In some embodiments, the imaging lens 340c may be omitted. In some embodiments, the third imaging path 301c may not be present, or may not be utilised.

Figure 4:
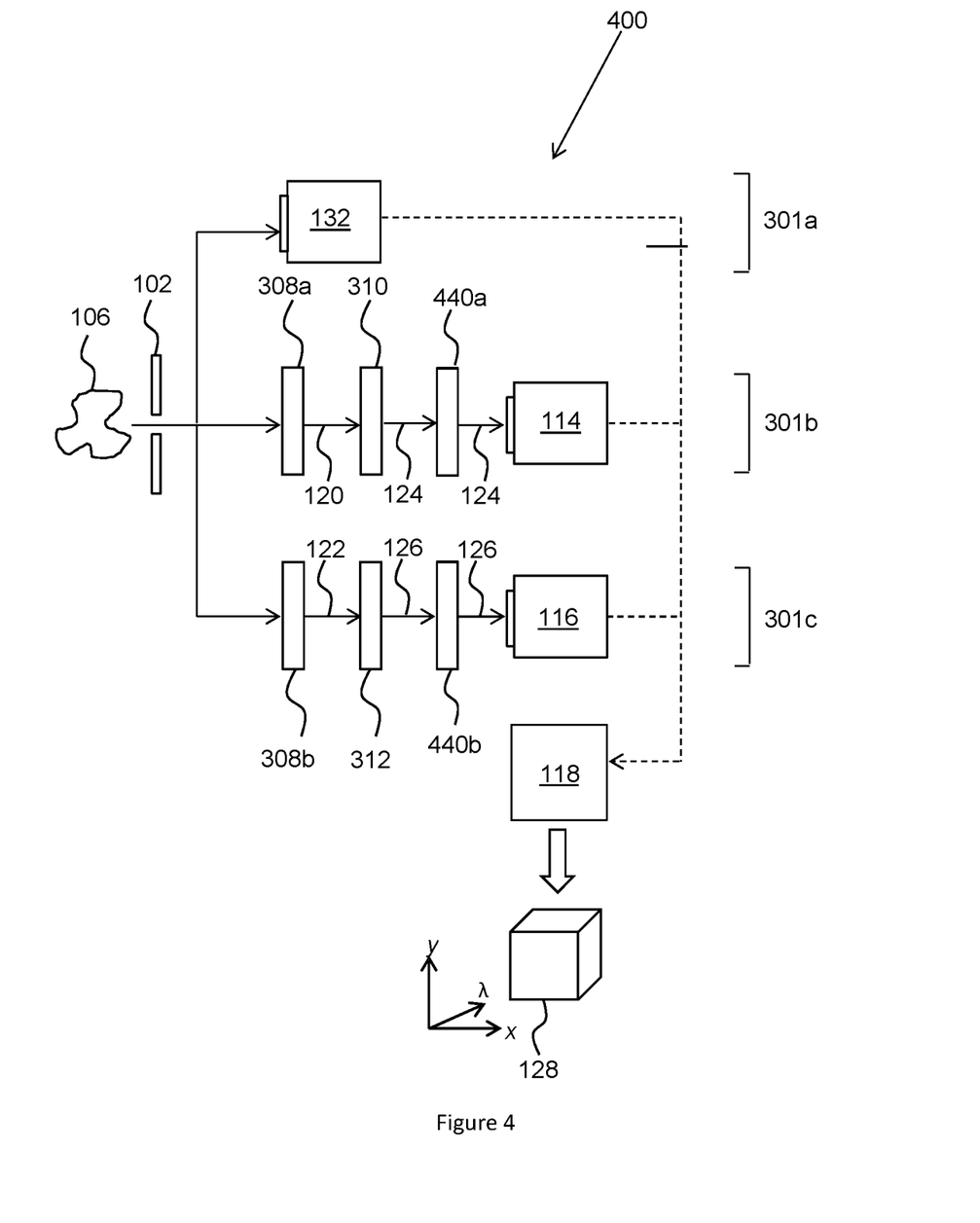
FIG. 4 shows a further embodiment of a hyperspectral imaging device 400.

FIG. 4 shows a further embodiment of a hyperspectral imaging device 400. The hyperspectral imaging device 400 is substantially similar to the hyperspectral imaging device 300 described above, although the imaging and relay lenses are not depicted.

The hyperspectral imaging device 400 further comprises a spectral encoder 440. The spectral encoder 440 is configured to spectrally encode the first 124 and second 126 sheared light fields prior to their detection by the first 114 and second 116 array detectors respectively. In the embodiment shown, the spectral encoder 440 is arranged after the respective dispersive elements 310, 312 in the first 301a and second 301b imaging paths. In the embodiment shown, similar to the encoder 308, the spectral encoder 440 comprises a first spectral encoder portion 440a configured to spectrally encode the first sheared light field 124, and a second spectral encoder portion 440b configured to spectrally encode the second sheared light field 126. The first spectral encoder portion 440a operates as part of the first imaging path 301a, while the second spectral encoder portion 440b operates as part of the second imaging path 301b. In some embodiments, the first 440a and second 440b spectral encoder portions are complementary to one another, but this is not essential.

In the embodiment shown, the spectral encoder 440 is a transmissive encoder, for example one or more arrays of apertures. As described above, use of transmissive components may enable easier miniaturisation of the hyperspectral imaging device 400. In other embodiments, the spectral encoder may be a reflective encoder, for example a digital micro-mirror device.

The hyperspectral imaging device 300 described above only encodes in the spatial domain using the encoder 308. The spectral encoder 440, in conjunction with the encoder 308 enables the hyperspectral imaging device 400 to encode in both the spatial and spectral domains. An additional degree of freedom in encoding may allow for a higher degree of incoherence (randomness/orthogonality) in the sampling of the datacube 128, which may improve reconstruction.

Alternatively, the spectral encoder 440 may be used independently of the encoder 308 (which may be omitted from the hyperspectral imaging device 400) in order to provide only spectral encoding. It will also be appreciated that a spectral encoder (such as spectral encoder 440) could be implemented in the hyperspectral imaging devices 100, 200 described above. The spectral encoder may be implemented as a single spectral encoder, or as a plurality of spectral encoder portions. For example, if the first 120 and second 122 encoded light fields (and consequently the first 124 and second 126 sheared light fields) are temporally separated, a single spectral encoder 440 may be employed to spectrally encode the first 124 and second 126 sheared light fields.

Figure 5:
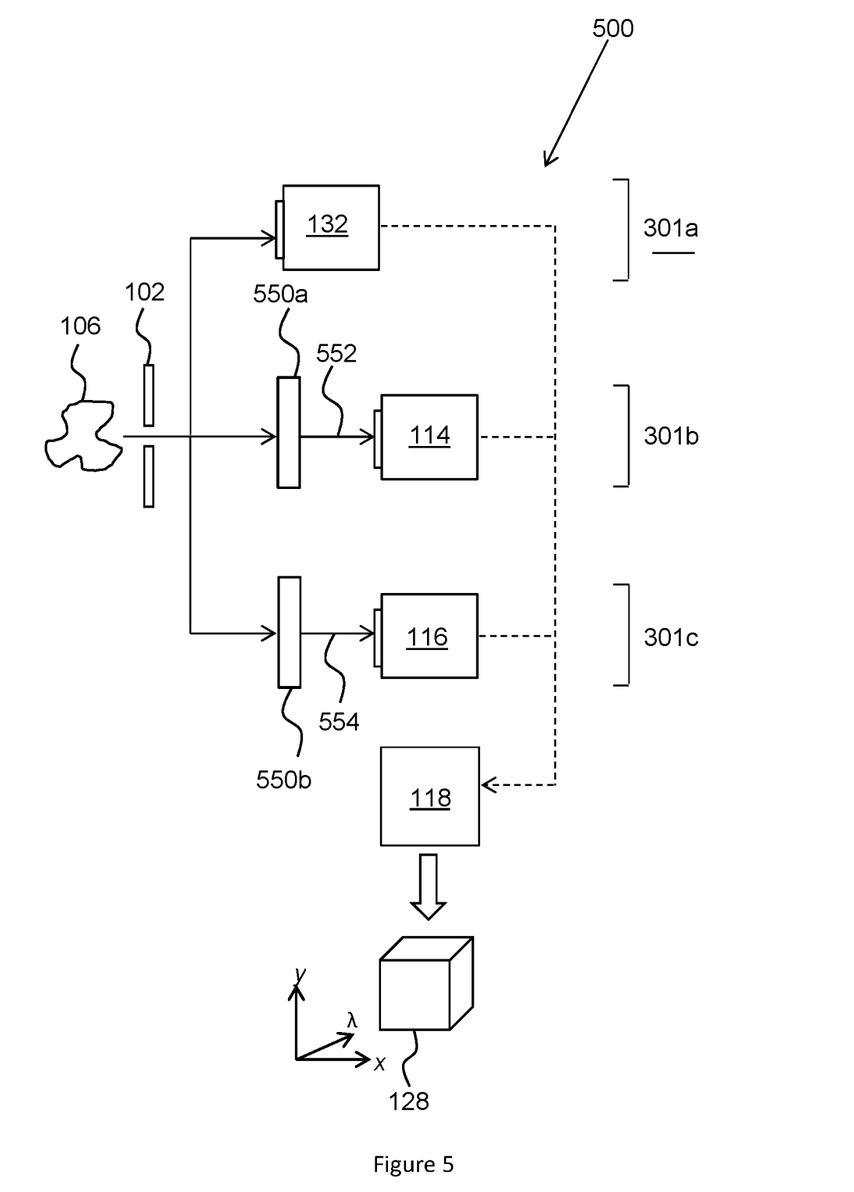
FIG. 5 shows an embodiment of a hyperspectral imaging device 500.

In the above described embodiments, encoding and dispersion is performed by two discrete, separate components, namely the encoder 108, 308 and the at least one dispersive element 110, 112, 310, 312. FIG. 5 shows an embodiment of a hyperspectral imaging device 500. The hyperspectral imaging device 500 is similar to the embodiments shown in FIG. 3 and FIG. 4.

However, in the embodiment shown in FIG. 5, the encoder 308 and the at least one dispersive element 310, 312 are integrated into a single component. The single component is an integrated encoding and dispersion element 550. The integrated encoding and dispersion element 550 provides first 552 and second 554 light fields which are both encoded and sheared. Effectively, the integrated coding and dispersion element 550 provides both the first encoded light field 120 and the first sheared light field 124 as a single first encoded and sheared light field 552 (and correspondingly the second encoded light field 122 and the second sheared light field 126 as a single second encoded and sheared light field 554).

In the embodiment shown, the first encoder portion 308a and the first dispersive element 310 on the first imaging path 301a have been replaced have been replaced by a first integrated encoding and dispersion element 550a (and correspondingly second encoder portion 308b and second dispersive element 312 on the second imaging path 301b by an integrated encoding and dispersion element 550b).

In the embodiment shown, the integrated encoder and dispersive element 550 is a transmissive component. In some embodiments, the integrated encoding and dispersion element 550 may comprise a dispersive element (for example, a diffraction grating such as a transmissive diffraction grating) on which an encoding pattern is disposed (for example, using a lithographic process).

The integrated encoding and dispersion element 550 shortens the beam paths in the discrete imaging paths 301a, 301b of the hyperspectral imaging device 500, which may further enable easier miniaturisation of the hyperspectral imaging device 500.

Optionally, a spectral encoder such as spectral encoder 440 described above may be used in conjunction with the integrated encoding and dispersion element 550 in order to encode in both the spatial and spectral domains.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality and reference signs in the claims shall not be construed as limiting the scope of the claims.

The invention claimed is:

1. A hyperspectral imaging device comprising an input for receiving a light field from a scene, an encoder, at least one dispersive element, at least one array detector and a processor, wherein:
the encoder is arranged to receive at least a portion of the light field from the input and transform it to provide a first and second encoded light field having different spatial patterns;
at least one dispersive element are arranged to apply spectral shear to the first and second encoded light fields respectively to provide first and second sheared light fields;
at least one array detectors arranged to detect the first and second sheared light fields;
the processor is arranged to process an output from the at least one array detector to determine a datacube corresponding to a hyperspectral image of the scene; and
the processor is arranged to solve a minimization problem of the form $$\min_I\{\frac{1}{2}\|[S_1,S_2]^T-[k_1o_1,k_2o_2]^TI\|^2+\alpha\phi(I)\}$$

where $S_1$ is the signal detected by the first detector, $S_2$ is the signal detected by the second detector, $k_1$ and $k_2$ are weighting factors, $o_1$ and $o_2$ are measurement operators dependent on the encoder and first and second dispersive elements, $\phi(I)$ is a regularizer that promotes sparsity, $\alpha$ is a regularization paramter, $\|.\|$ denotes the $l^2$ norm and $I=I(x,y,\lambda)$ is the datacube.

2. The hyperspectral imaging device of claim 1, wherein the encoder is arranged to provide spatially separated first and second encoded light fields having complementary spatial patterns; and
the complementary spatial patterns are complementary random or pseudorandom spatial patterns, and/or wherein the spatial patterns are binary.

3. The hyperspectral imaging device of claim 2, wherein the at least one dispersive element comprises a first dispersive element configured to apply a first spectral shear to the first encoded light field, and a second dispersive element configured to apply a second spectral shear to the second encoded light field.

4. The hyperspectral imaging device of claim 3, wherein the at least one array detector comprises a first and second array detector, respectively arranged to detect the first and second sheared light fields.

5. The hyperspectral imaging device of claim 4, further comprising a beam splitter and a third array detector, wherein the beam splitter is arranged between the input and the encoder and is arranged to provide a portion of the light field to the third array detector and the remaining portion of the light field to the encoder, wherein the portion of the light field provided to the third array detector is unsheared.

6. The hyperspectral imaging device of claim 5, wherein the processor is further arranged to process an output from the third detector jointly with the outputs from the first and second detectors to determine the datacube.

7. The hyperspectral imaging device of claim 1, wherein the spectral shear applied to the first and second encoded light field have different magnitudes and/or different spatial directions.

8. The hyperspectral imaging device of claim 1, wherein the encoder is transmissive, or the at least one dispersive element is transmissive, or both the encoder and the at least one dispersive element are transmissive.

9. The hyperspectral imaging device of claim 1, wherein the encoder comprises a first encoder portion configured to provide the first encoded light field, and a second encoder portion configured to provide the second encoded light field, and wherein the first encoder portion is disposed on a first discrete imaging path, and the second encoder portion is disposed on a second discrete imaging path.

10. The hyperspectral imaging device of claim 9, wherein the first discrete imaging path and the second discrete imaging path are parallel to one another.

11. The hyperspectral imaging device of claim 1, further comprising a spectral encoder arranged to spectrally encode the first and second sheared light fields prior to detection by the at least one array detector.

12. The hyperspectral imaging device of claim 11, wherein the spectral encoder comprises a first spectral encoder portion configured to spectrally encode the first sheared light field, and a second spectral encoder portion configured to spectrally encode the second sheared light field.

13. The hyperspectral imaging device of claim 12, wherein the spectral encoder comprises a first encoder portion configured to provide the first encoded light field, and a second encoder portion configured to provide the second encoded light field, and wherein the first encoder portion is disposed on a first discrete imaging path, and the second encoder portion is disposed on a second discrete imaging path, and wherein the first spectral encoder portion is disposed on the first discrete imaging path, and the second spectral encoder portion is disposed on the second discrete imaging path.

14. The hyperspectral imaging device of claim 1, further comprising a focussing element located between the input and the encoder;
wherein the focussing element is arranged to image the scene onto the encoder.

15. The hyperspectral imaging device of claim 1, wherein the at least one dispersive element comprises at least one concave grating; or
at least one of the dispersive elements is formed from a combination of a focussing element and a planar grating.

16. The hyperspectral imaging device of claim 15, wherein the at least one dispersive element is arranged to image the sheared light field onto the at least one detector respectively.

17. The hyperspectral imaging device of claim 1, wherein the encoder and the at least one dispersive element are integrated into a single component;
wherein the integrated encoder and at least one dispersive element comprises an encoding pattern disposed on a diffraction grating.

18. The hyperspectral imaging device of claim 1, wherein the processor is arranged to determine the datacube by solving a minimization problem.

19. A method of hyperspectral image acquisition, comprising:
receiving a light field from a scene;
transforming the light field to provide first and second encoded light fields having different spatial patterns;
applying spectral shear to the first and second encoded light fields respectively to provide first and second sheared light fields;
detecting the first and second sheared light fields respectively to provide detection data; and processing the detection data to determine a datacube corresponding to a hyperspectral image of the scene;

wherein processing the detection data comprises solving a minimization problem of the form $$\min_I\{½\|[S_1,S_2]^T-[k_1o_1,k_2o_2]^T I\|^2+\alpha\phi(I)\}$$

where $S_1$ is the signal detected by the first detector, $S_2$ is the signal detected by the second detector, $k_1$ and $k_2$ are weighting factors, $o_1$ and $o_2$ are measurement operators dependent on the encoder and first and second dispersive elements, $\phi(I)$ is a regularizer that promotes sparsity, $\alpha$ is a regularization paramter, $\|.\|$ denotes the $l^2$ norm and $I=I(x,y,\lambda)$ is the datacube.

* * * * *